(No Model.)
W. S. DOWNER.
HORSE DETACHER.
No. 362,881. Patented May 10, 1887.
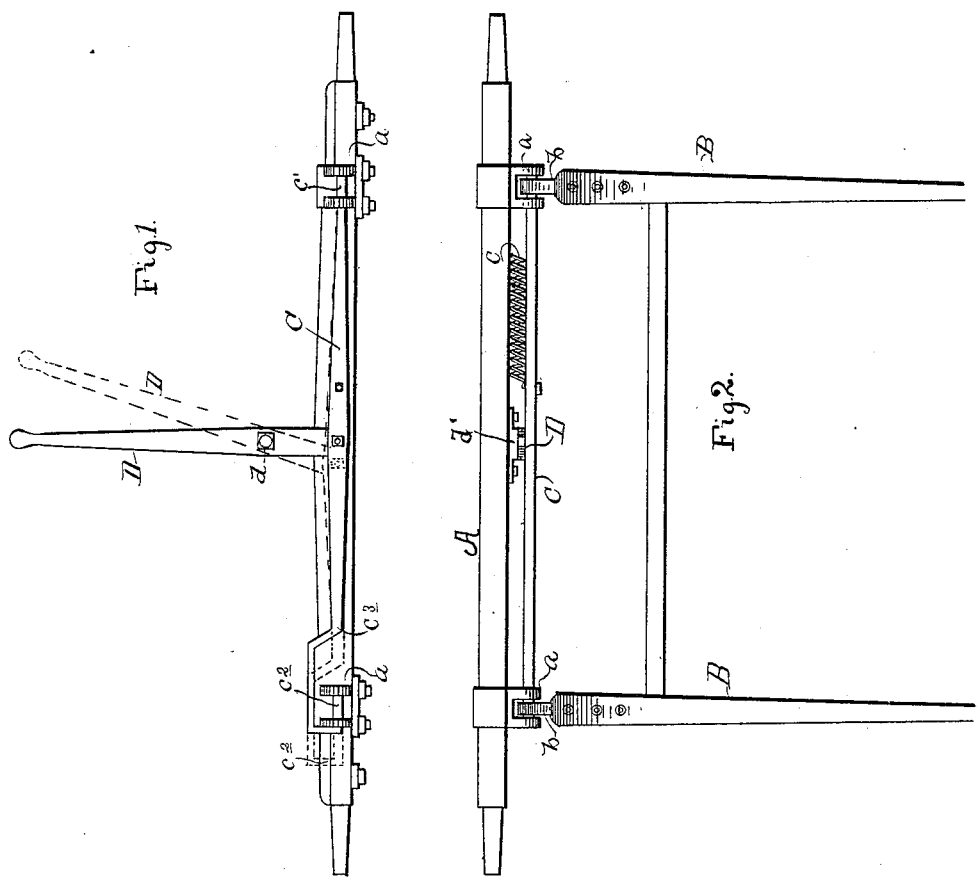
Witnesses
Geo. H. Harvey
W. E. Bowen
Inventor
William S. Downer
by J. H. Stevenson
atty.

UNITED STATES PATENT OFFICE.

WILLIAM S. DOWNER, OF COAL CENTRE, ASSIGNOR OF TWO-THIRDS TO JOSEPH MERRINGTON AND I. N. FINCH, BOTH OF PITTSBURG, PA.

HORSE-DETACHER.

SPECIFICATION forming part of Letters Patent No. 362,881, dated May 10, 1887.

Application filed September 18, 1886. Serial No. 213,932. (No model.)

*To all whom it may concern:*

Be it known that I, WILLIAM S. DOWNER, of Coal Centre, Washington county, Pennsylvania, have invented a new and useful Improvement in Devices for Detaching Runaway Horses from Vehicles, which improvement is fully set forth in the following specification, reference being had to the accompanying drawings.

This is an invention for quickly and easily detaching the thills from a vehicle, so as to release a refractory or runaway horse or horses from a vehicle; and it consists in the parts and combinations which will be hereinafter specified, and pointed out in the claims.

In the accompanying drawings, Figure 1 represents a front elevation of the front axle of a vehicle provided with my improvement, and Fig. 2 is a top plan view thereof.

Like letters indicate like parts in the two figures.

A indicates a vehicle-axle, and B B thills.

$a$ $a$ are recessed lugs or clips. Each of these lugs is provided with two ears, between which is the recess for the reception of the thill-eye $b$ on the rear end of the thill B.

C is a laterally-movable bar pivoted to the lower end of the lever D. This lever is fulcrumed at $d$ to a short standard, $d'$, in the rear thereof. The standard $d'$ is secured to the axle A. The bar C is rounded on its outer straight end at $c'$. The other end of said bar, $c^2$, is in the nature of a hook. The extreme end of the bar C, on its hook end, is provided with a rounded end. Said end and the rounded end $c'$ are in the nature of bolts. The lugs $a$ $a$ are provided with transverse rounded openings for the reception of the rounded ends of the bar. Said ends are adapted to be moved in and out of the lug-openings for the purpose of engaging the thill-eyes $b$, and to be disengaged therefrom at the pleasure of the driver to detach the horse from the vehicle, which will be more fully hereinafter specified.

The letter $e$ represents a spiral spring. One end of this spring is secured to the axle A and the other end thereof to the movable bar C. The spring is so arranged as to normally hold the bar ends $c'$ $c^2$ in engagement with the transverse openings in the lugs $a$, as shown in Fig. 2. Said bar ends will engage said eyes and securely hold the thills in connection with the vehicle.

The operation of the device is as follows: Should the horse attempt to run away or become unmanageable, so as to endanger the lives of the occupants of the vehicle, the driver can easily and quickly detach the animal from the vehicle. This is done by turning the lever to one side, as shown in dotted lines, Fig. 1. Such action moves the bar C to one side and disengages the two ends $c'$ $c^2$ thereof from the thill-eyes $b$ $b$. The bend or shoulder $c^3$ in the bar limits the side movement, so that when the thills are disengaged the bar ends $c'$ $c^2$ are not wholly drawn out of $a$, but are drawn just far enough to permit the thill-eyes to become disengaged from the bar ends. When the lever is released from the hand, it assumes its normal vertical position, and the bar ends $c'$ $c^2$ are again placed in engagement with the openings in the lugs $a$, as shown in Fig. 1.

The device is further useful in changing thills.

The lever D and the standard to which it is fulcrumed may be placed in front of the dash-board, or they may be arranged so as to stand behind said board. Either may be done without departing from the spirit of my invention.

It will be observed that the hook end of the bar C is bent upward, thence outward, thence downward, and thence inward, so that the rounded part $c^2$ enters the lug-openings from the outer side, while the rounded end $c'$ on the other end of the bar enters the lug-openings from the inner side.

Having thus described my invention, I claim as new and desire to secure by Letters Patent—

1. The device herein specified, consisting in a bar having a straight end and a bent hook end, and lugs provided with transverse openings for the reception of the ends of the bar aforesaid, in combination with a lever and a standard, the lever being engaged to the bar and fulcrumed to the standard, substantially as specified.

2. The device herein specified, consisting in a bar having one straight end and a bent hook end, and lugs provided with transverse openings for the reception of the bar ends, in combination with a spring interposed between the bar and vehicle-axle, and a lever for actuating the bar, substantially as specified.

3. The device herein specified, consisting in a bar having a straight end and a bent hook end, and lugs provided with transverse openings for the reception of the ends of the bar, the hook end of the bar being provided with a shoulder adapted to engage its lug, so as to limit the stroke of the bar, in combination with a lever for actuating the bar, substantially as specified.

4. The device herein specified, consisting in the combination of a movable bar having a straight end and a bent hook end, of lugs on the axle provided with transverse openings for the reception of the ends of the bar, of a spring for holding said ends in the lug-openings, and a lever for actuating the bar, the hook end of the bar being provided with a shoulder for limiting the movement of the bar, substantially as specified.

5. The combination of the axle provided with a standard, $d'$, and lugs $a$, secured thereto, said lugs being provided with transverse openings, of a movable bar straight on one end and hooked on the other, the hooked end thereof being provided with a shoulder for limiting the movement of the bar, of a spiral spring for holding the ends of the bar engaged in the lug-openings, and of a lever having one end secured to the bar and fulcrumed to the standard aforesaid, substantially as specified.

WILLIAM S. DOWNER.

Witnesses:
SAML. K. DUFF,
E. W. BARRIS.